United States Patent [19]

Schuyler

[11] Patent Number: 5,535,561
[45] Date of Patent: Jul. 16, 1996

[54] CABLE HOLD DOWN AND BRACING SYSTEM

[76] Inventor: Peter W. Schuyler, 2750 Trinity Rd., Glen Ellen, Calif. 95442

[21] Appl. No.: 298,150

[22] Filed: Aug. 30, 1994

[51] Int. Cl.⁶ .................... E02D 27/50; E04H 9/14
[52] U.S. Cl. .................. 52/223.13; 52/92.2; 52/223.14; 52/223.6; 52/293.3; 411/392; 411/544; 411/916
[58] Field of Search .................... 52/92.1, 92.2, 52/223.13, 223.14, 293.3, 295, 23, 167.3, 169.9, 223.1, 223.4, 223.6, 300, 566, 745.21, DIG. 11; 411/383, 384, 392, 544, 916

[56] References Cited

U.S. PATENT DOCUMENTS

| | | | |
|---|---|---|---|
| 351,407 | 10/1886 | Simmons | 52/223.6 X |
| 1,702,340 | 2/1929 | Gates | 52/92.1 |
| 1,783,383 | 12/1930 | Montrief | 52/92.1 X |
| 2,011,312 | 8/1935 | Engman | 52/223.13 |
| 2,689,987 | 9/1954 | Berger | 52/293.3 |
| 3,841,040 | 10/1974 | Toulson et al. | 52/92.1 |
| 3,858,991 | 1/1975 | Burtelson | 52/223.13 X |
| 3,937,607 | 2/1976 | Rodormer | 52/223.13 X |
| 4,124,321 | 11/1978 | Hutchins | 52/223.13 X |
| 4,718,209 | 1/1988 | Hansen et al. | 52/223.13 |
| 4,812,096 | 3/1989 | Peterson | 52/223.13 X |
| 5,168,681 | 12/1992 | Ayrapetyan | 52/730.7 X |
| 5,384,993 | 1/1995 | Phillips | 52/295 X |

*Primary Examiner*—Lanna Mai
*Assistant Examiner*—Kevin D. Wilkens
*Attorney, Agent, or Firm*—Larry D. Johnson

[57] ABSTRACT

A method and apparatus for tying building components together or to the ground utilizes a system of spring-tensioned cables strung between the foundation and the top corners of any shear diaphragm. The cables are kept under tension regardless of the shrinkage of wooden components, providing evenly-distributed compression on the structure's framing members.

6 Claims, 1 Drawing Sheet

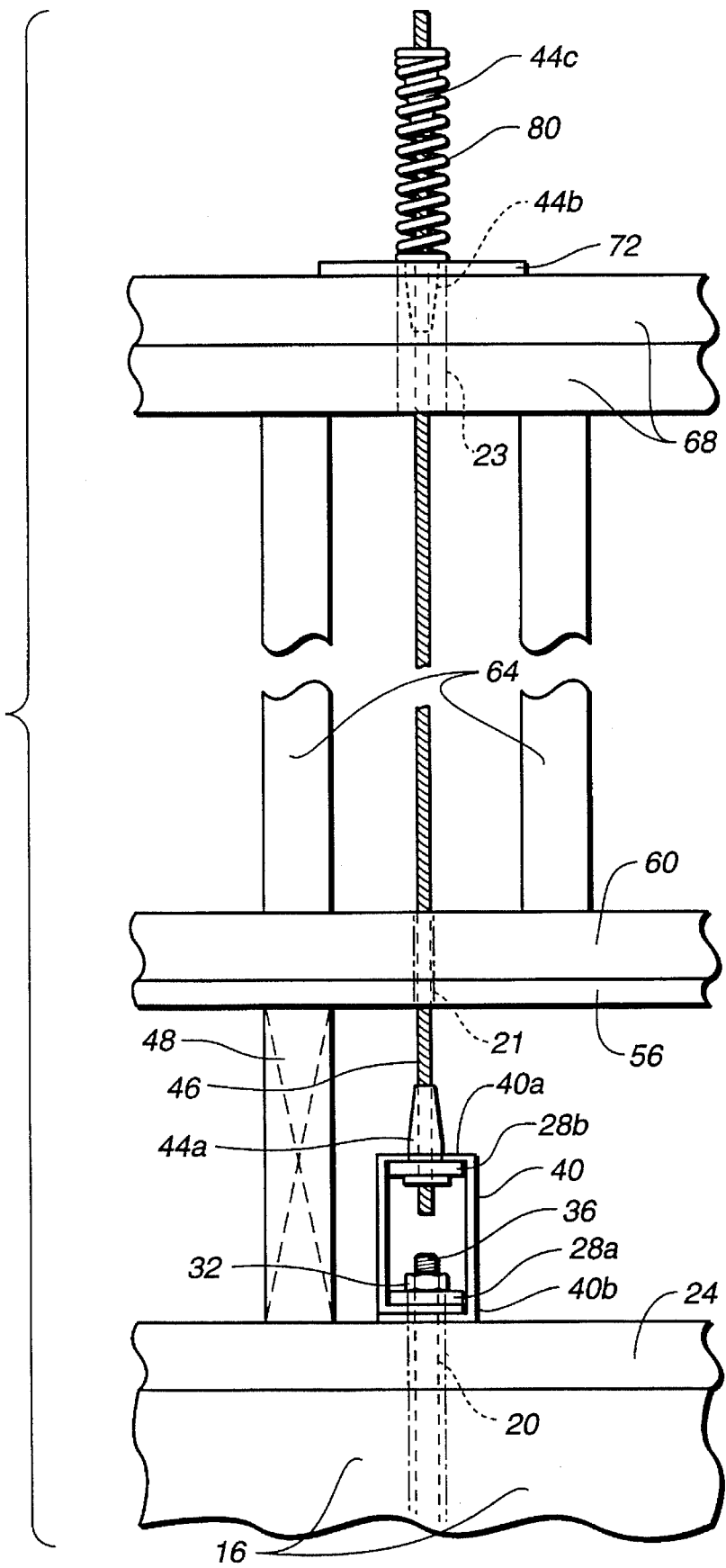

CABLE HOLD DOWN AND BRACING SYSTEM

BACKGROUND OF THE INVENTION

1. Field of the Invention

This invention relates generally to building construction methods and apparatus, and more specifically to an improved cable hold down and bracing system that ties building components together or to the ground, providing stabilization and resistance to uplift or overturning caused by wind, ground movement, earthquakes, or similar forces.

2. Description of the Prior Art

To reduce the effects of earthquakes, ground movements, hurricanes, typhoons, tornadoes and similar destructive forces, structures must be constructed to resist uplift or overturning forces. The most common structural uplift stabilization technique in use today is the nailing of plywood to structural framing members, creating a shear diaphragm. Shear diaphragms are then secured to adjacent diaphragms and to the foundation, forming a unified structure resistant to uplift and/or overturning.

The devices that are used to secure the shear diaphragms together and to the foundation are referred to as "hold down(s)". The most widely used "hold down" is in the form of a metal "L" shaped bracket, such as that described in U.S. Pat. No. 4,665,672. "Hold down" brackets are designed to be attached to a vertical framing member above the foundation, and to the foundation at each end of the shear diaphragm. This is typically done by: (a) through-bolting multiple L-shaped brackets to vertical framing members with two or more bolts; (b) interconnecting vertically-aligned L-shaped brackets using threaded rods; and (c) connecting L-shaped brackets to the foundation using threaded rods that have been imbedded within the foundation. This technique is repeated wherever vertical framing members are separated by horizontal (or perpendicular) framing members, and is also practiced in a horizontal manner to interconnect shear panels or remote building members.

There are significant disadvantages to the "hold down" technique described above:

1. Slack created in the threaded rods from shrinkage of the wood framing members is common, creating impact loads leading to a greater risk of failure;
2. Many components of varying sizes are required, resulting in large inventory requirements;
3. Precise alignment of anchor bolts and thoughholes for threaded rods and installation of same is difficult and very time-consuming;
4. A high degree of labor skill is required, due to the complexity of the system and the precise alignment of holes/brackets; and
5. Installation of the brackets must be staged during different phases of the construction process, resulting in increased cost and increased number of inspections by building officials.

Furthermore, in extreme conditions such as during an earthquake, traditional hold down techniques may be inadequate. An earthquake releases moving point forces which are directed upward and sideways through the foundation to the framing members of a structure. These forces can cause a structure's shear diaphragms to rotate, buckle and/or separate, which can lead to the failure of the structure.

Rotational and point loading can be absorbed by the framing and shear diaphragms without over stressing the structure. This is attained by restricting the movement of the top corners of the shear diaphragms relative to the foundation, and by preventing separation of the framing members and shear diaphragms.

SUMMARY OF THE INVENTION

The cable hold down and bracing system of this invention provides a method and apparatus for tying building components together or to the ground, providing stabilization and resistance to uplift or overturning caused by wind, ground movement, earthquakes, or similar forces. The inventive system uses a system of cables or rods strung between the foundation or other base and the top corners of any shear diaphragm. The invention's cables are kept under tension regardless of the shrinkage of wooden components, providing evenly-distributed compression on the structure's framing members. As a result, any relative movement caused by vertically applied ("uplift") forces or horizontally applied forces is prevented from the first moment of application, greatly reducing the damage typically attributed to impact loading. This differs from the destructive effect of vertical and horizontal movement on traditional "hold-down" techniques, which cannot adjust to the slack caused by the shrinkage of wood framing, making them highly vulnerable to impact loading stresses. The inventive system may also be used with metal framing instead of wood.

The inventive system may be used to secure each shear diaphragm assembly within a structure to adjacent shear diaphragms assemblies; and/or secure the interconnected shear diaphragm assemblies to the structure's foundation.

This creates a highly unified, rigid structure capable of resisting uplift and overturning forces. By incorporating specially-designed stranded wire rope or cables, springs, and brackets, the inventive system maintains an evenly-distributed compression amongst structural framing members over the life span of a structure, regardless of dimensional changes caused by wood and/or increased loads that may be imposed due to earthquakes, soil movement, settling, hurricane, typhoons, or similar forces.

The inventive system offers significant advantages over known techniques. These advantages include:

1. Lower costs of materials and assembly. Fewer components are required, resulting in smaller inventory requirements; less diversity in parts is required; no special (i.e., higher wage) labor skills are required; alignment of brackets and holes is more forgiving, reducing complexity and time of installation; and installation can be done all at once, rather than spread across several stages of construction.
2. Improved structural integrity throughout a structure's life cycle. The inventive system eliminates impact loads which commonly occur from wood shrinkage; and maintains evenly-distributed compression throughout the structure.
3. The inventive system is applicable to wider range of structures. It can be used to retrofit existing structures with little or no removal of wall coverings; and can be easily installed in mobile homes and modular building structures.
4. The inventive system enables ease of inspection. It can be installed all at once (rather than in phases), reducing requirement for multiple inspections; and it can be inspected after the structure is completed, since primary components are located in the foundation (basement or crawl space) and attic (under the roof).

BRIEF DESCRIPTION OF THE DRAWINGS

FIG. 1 is a cutaway side elevation view of a cable hold down and bracing system of this invention, illustrating the components and assembly of the inventive system.

DETAILED DESCRIPTION OF A PREFERRED EMBODIMENT

FIG. 1 is a cutaway side elevation view of a cable hold down and bracing system of this invention, illustrating the components and assembly of the inventive system. The inventive system may be installed in the following manner:

1. An anchor bolt 36 is embedded in the foundation 16 of the structure, extending through a drilled hole 20 in the mud sill 24. This will serve as the lower securement point for the stranded wire rope 46, which ties the foundation to the top of the shear diaphragm(s).

2. An anchor bolt strap component 40, which is a rectangular steel box that has a hole through the single thickness short side 40a and a hole through both thicknesses of the double thickness short side 40b, is secured to the mud sill 24 by a nut 32 threaded on the anchor bolt 36 and tightened against a square flat washer with a round hole 28a (washer 28a prevents distortion of the long legs of the anchor bolt strap 40 and provides a seat against which the nut 32 is tightened). The double thickness short side 40b of the anchor bolt strap component 40 faces the mud sill 24. The anchor bolt strap 40 transmits forces from the anchor bolt 36 to the "dead-end" cinching device 44a and in turn to the stranded wire rope 46.

3. A "dead-end" device or other cable gripping device 44a, comparable in design, function, and strength to that offered by Fargo Manufacturing Company, P.O. Box 2900, Poughkeepsie, N.Y. 12063 is inserted through the hole of a square flat washer 28b (washer 28b prevents distortion of the long legs of the anchor bolt strap 40 and provides a seat for the shoulder of "dead-end" cinching device 44a which grips the stranded wire rope 46). This assembly passes up through the hole of the single thickness short end 40a of the anchor bolt strap 40.

Note: The components described in items #1–3 above simply provide a means of securely affixing the stranded wire rope 46 to the foundation 16. This arrangement is not vital nor important to the function of the invention. For example, the anchor bolt strap 40 can extend into the foundation 16, eliminating the need for the anchor bolt 36, nut 32, and square flat washer 28a. With reduced loads, washer 28b can be eliminated.

4. The stranded wire rope or cable 46 extends through hole 21 in the structure's subfloor 56 and sole plate 60 (which are separated from mud sill 24 by floor joist 48), and hole 23 in top plates 68 (which are separated from sole plate 60 by vertical framing members 64). The stranded wire rope 46 is passed up through any other intervening horizontal (or perpendicular) framing members to the last in-line horizontal (or perpendicular) framing member 68 of the shear diaphragm.

5. A flat metal plate 72 with a hole through the center is placed on the top plate 68, and is positioned over the hole 23 that has been drilled through the structure's top plates.

6. A "dead-end" cinching device 44b is inserted over the stranded wire rope 46 and through the hole in the flat metal plate 72. The "dead-end" device transfers the load from the stranded wire rope 46 to the top plate 68, evenly distributing the forces generated by earthquake, wind, or other external forces and restricting any movement of the top of the shear diaphragm relative to the ground or other attachment points.

7. A further "dead-end" device 44c is inserted in one end of a compression spring 80. This assembly is then placed over the stranded wire rope 46 and on the top of the flat metal plate 72.

8. The stranded wire rope 46 is then pulled taut, and force is applied to the top of the "dead-end" device 44c, causing the "dead-end" device 44c to slide down the stranded wire rope 46 to compress the spring 80 against "dead-end" cinching device 44b, keeping "dead-end" cinching device 44b and the metal load spreading plate 72 in direct contact with the structure's top plate 68.

The stranded wire rope may be tensioned by pulling the stranded wire rope away from "dead-end" cinching device 44c while simultaneously exerting force against the top of "dead-end" cinching device 44b until the metal spring 80 is properly compressed. This tensioning may be accomplished by any number of existing or specialized tools.

As the wooden framing of a structure shrinks or settles over time, slack in the stranded wire rope 46 is continually eliminated. The metal spring 80, under constant compression, forces the "dead-end" cinching device 44b down on the cable to the point at which metal load spreading plate 72 remains in contact with the structure's top plate (horizontal framing member) 68. The "dead-end" cinching device 44b has an internal spring that forces the wedges to be repositioned on the stranded wire rope 46.

In the event of an earthquake, sudden earth movement, high winds, hurricane, or similar force that causes uplift, the structure' top plate 68 typically moves away from the foundation. When this occurs, the metal load spreading plate 72 causes the "dead-end" cinching device 44b to grip the stranded wire rope 46, maintaining tension on the stranded wire rope 46 and preventing further movement. This dynamic adaptation resists separation, uplift, and overturning forces.

The inventive system can be used to retrofit existing structures using a variety of techniques. The most straightforward technique is as follows:

A long-shafted drill bit is inserted into a pipe. (The pilot tip of the drill must be large enough to accommodate the diameter of the pipe). Starting at the structure's top wall, a hole is drilled through the top plate(s). The pipe containing the long-shafted drill bit is pushed down through the hole until it comes in contact with a framing member. Another hole is then drilled through the framing member. The process continues until the pipe comes out of the bottom of the last horizontal framing member. The drill bit is then removed and a cable is passed through the pipe. The remaining components of the inventive system are then attached to the top plates and to the foundation, as described previously. Any resulting holes in the roof are then patched.

When properly installed, the inventive system provides continuous connection (rigidity) between the top of a structure's shear diaphragms and the structure's foundation. This rigidity prevents damage from uplift, downward forces, or overturning forces typically caused by settling of soil, sudden or gradual earth movements, earthquakes, high winds, and hurricanes.

The added rigidity provided by the inventive system does not decrease over time, which is a common problem with other standard techniques. As shrinkage or settling occurs within a structure, the invention's components are kept continually under tension, eliminating the loads and stresses that can lead to the failure of a structure when subjected to extreme conditions.

While this invention has been described in connection with preferred embodiments thereof, it is obvious that modifications and changes therein may be made by those skilled in the art to which it pertains without departing from the spirit and scope of the invention. For example, an alternative application would provide for construction of shear diaphragm walls connected by a crossing "X" shaped configuration of cables, offering a shorter linear distance and additional cost savings. In addition, the inventive system may be used for securement of new or existing mobile homes to the ground (rather than a foundation), rendering them less vulnerable to wind or earthquake damage; securement of walls in new or existing structures in order to resist floor or roof joists from falling in the event of earthquake; or securement of modular structures (both horizontally and vertically) for additional rigidity. Accordingly, the scope of this invention is to be limited only by the appended claims.

What is claimed as invention is:

1. A cable hold down and bracing system for a building having a building base and a building frame including a top plate portion, said system comprising:

a length of cable having a first end and a second end;

anchor means for securing said cable first end to the building base;

first cable gripping means for securing said cable to the building frame top plate portion through a hole in the building frame top plate portion, said first cable gripping means positioned on the opposite side of the building frame top plate portion from said anchor means;

a spring placed on said cable adjacent said first cable gripping means; and second cable gripping means secured to said cable and compressing said spring against said first cable gripping means and the building frame top plate portion, wherein said system exerts continuous tension between the building frame top plate portion and the building base regardless of dimensional changes.

2. The cable hold down and bracing system of claim 1 wherein said anchor means for securing said cable first end to the building base comprises a bracket member connecting an anchor bolt in the building base to a third cable gripping device secured to said cable first end.

3. The cable hold down and bracing system of claim 1 said first cable gripping means comprises a dead-end cable cinching device.

4. The cable hold down and bracing system of claim 1 wherein said second cable gripping means comprises a dead-end cable cinching device.

5. The cable hold down and bracing system of claim 1 wherein said cable comprises a stranded wire rope.

6. The cable hold down and bracing system of claim 1 including a hole-bearing flat metal plate inserted between said first cable gripping means and the building frame top plate portion.

* * * * *